United States Patent
Miura et al.

Patent Number: 5,859,848
Date of Patent: Jan. 12, 1999

[54] ASYNCHRONOUS TRANSFER MODE PACKET CONVERSION TO ONE OF PLURAL FORMATS

[75] Inventors: Genmei Miura; Takahiro Tsukamoto, both of Tokyo; Koumei Takahashi, Yokohama, all of Japan

[73] Assignee: Canon Kabushiki Kaisha, Tokyo, Japan

[21] Appl. No.: 590,128

[22] Filed: Jan. 23, 1996

[30] Foreign Application Priority Data

Jan. 26, 1995 [JP] Japan .................................. 7-010675
Jan. 31, 1995 [JP] Japan .................................. 7-034246

[51] Int. Cl.$^6$ ............................. H04L 12/46; H04L 12/56
[52] U.S. Cl. .......................... 370/395; 370/401; 370/466
[58] Field of Search ..................................... 370/389, 392, 370/395, 397, 401, 402, 403, 409, 466; 395/200.02; 340/825.52

[56] References Cited

U.S. PATENT DOCUMENTS

| | | | |
|---|---|---|---|
| 5,062,106 | 10/1991 | Yamazaki et al. | 370/379 |
| 5,229,994 | 7/1993 | Balzano et al. | 370/401 |
| 5,379,289 | 1/1995 | DeSouza et al. | 370/230 |
| 5,392,399 | 2/1995 | Gilbrech | 395/200.02 |
| 5,434,863 | 7/1995 | Onishi et al. | 370/402 |
| 5,448,565 | 9/1995 | Chang et al. | 370/402 |
| 5,457,681 | 10/1995 | Gaddis et al. | 370/402 |

FOREIGN PATENT DOCUMENTS

| | | |
|---|---|---|
| 0354119 | 7/1990 | European Pat. Off. . |
| 0493233 | 1/1992 | European Pat. Off. . |
| 0 473 066 A1 | 4/1992 | European Pat. Off. . |
| 0 479 096 A1 | 8/1992 | European Pat. Off. . |
| 39 04 403 A1 | 8/1989 | Germany . |
| WO 93/26107 | 12/1993 | WIPO . |

OTHER PUBLICATIONS

"Endsystem–Netzzugänge Fur BERKOM und VBN", Hartenthaler H., and Kindt A., vol. 42, No. 2, 1992, *Nachrichtentech., Elektron* .

Patent Abstract of Japanese Patent Publication No. JP 06 029974 A, "Multiple Address Communication Method".

Yashiro, Z. et al., "High–Speed and High–Throughput Packet Swithching System For Multimedia Communications", *IEEE Global Telecomm. Conf.* vol. 1 of 3, 1988, pp. 435–439.

Suzuki, H. et al., "Very High–Speed and High–Capacity Packet Switching for Broadband ISDN", *IEEE Journal on Selected Areas in Communications*, vol. 6, No. 9, Dec. 1988, pp. 1556–1564.

Kitamura, A. et al., "High Speed and High Capacity Switching System Architecture for ISDN", *IEEE Int'l Switching Symposium*, 1987, pp. 809–813.

Fayet, C. et al., "High speed switching for ATM: the BSS", *Computer Networks and ISDN Systems*, vol. 26, No. 9, 1 May 994, pp. 1225–1234.

*Primary Examiner*—Hassan Kizou
*Attorney, Agent, or Firm*—Morgan & Finnegan, L.L.P.

[57] ABSTRACT

An asynchronous transfer mode (ATM) network control apparatus receives data, converts the data into an ATM packet, stores a table of header information for at least one communication network, changes the header of the received ATM packet on the basis of information in the ATM packet header and the stored table, and outputs the modified ATM packet. Units which perform these functions are connected to a general purpose bus line and a high-speed bus line.

23 Claims, 13 Drawing Sheets

F I G. 4
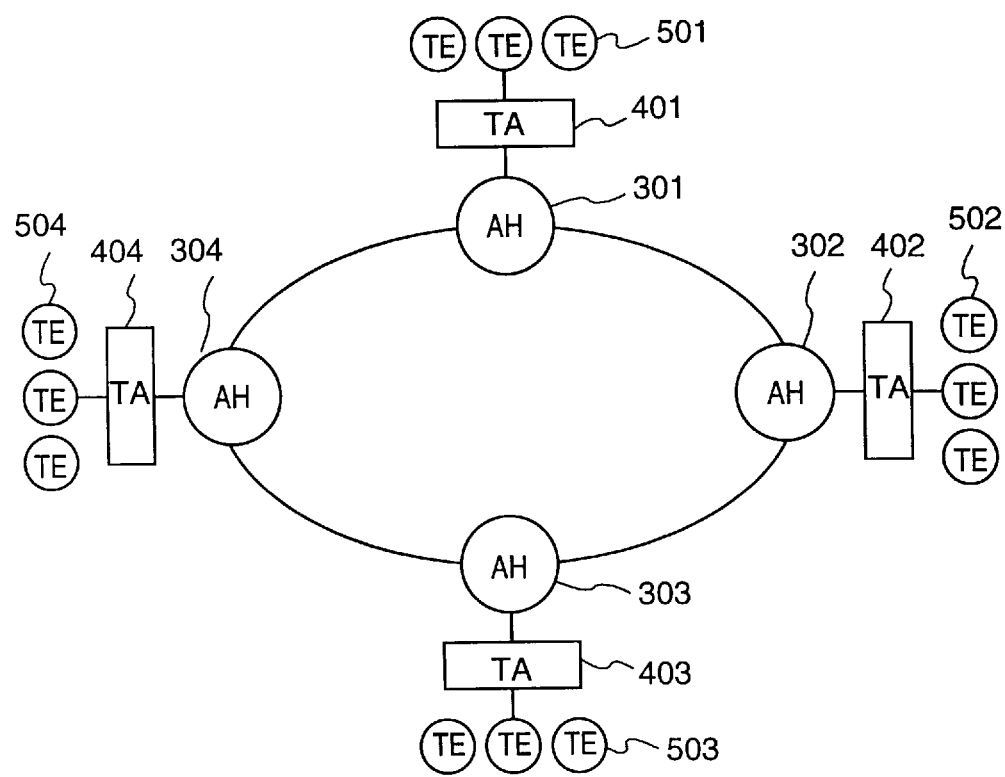

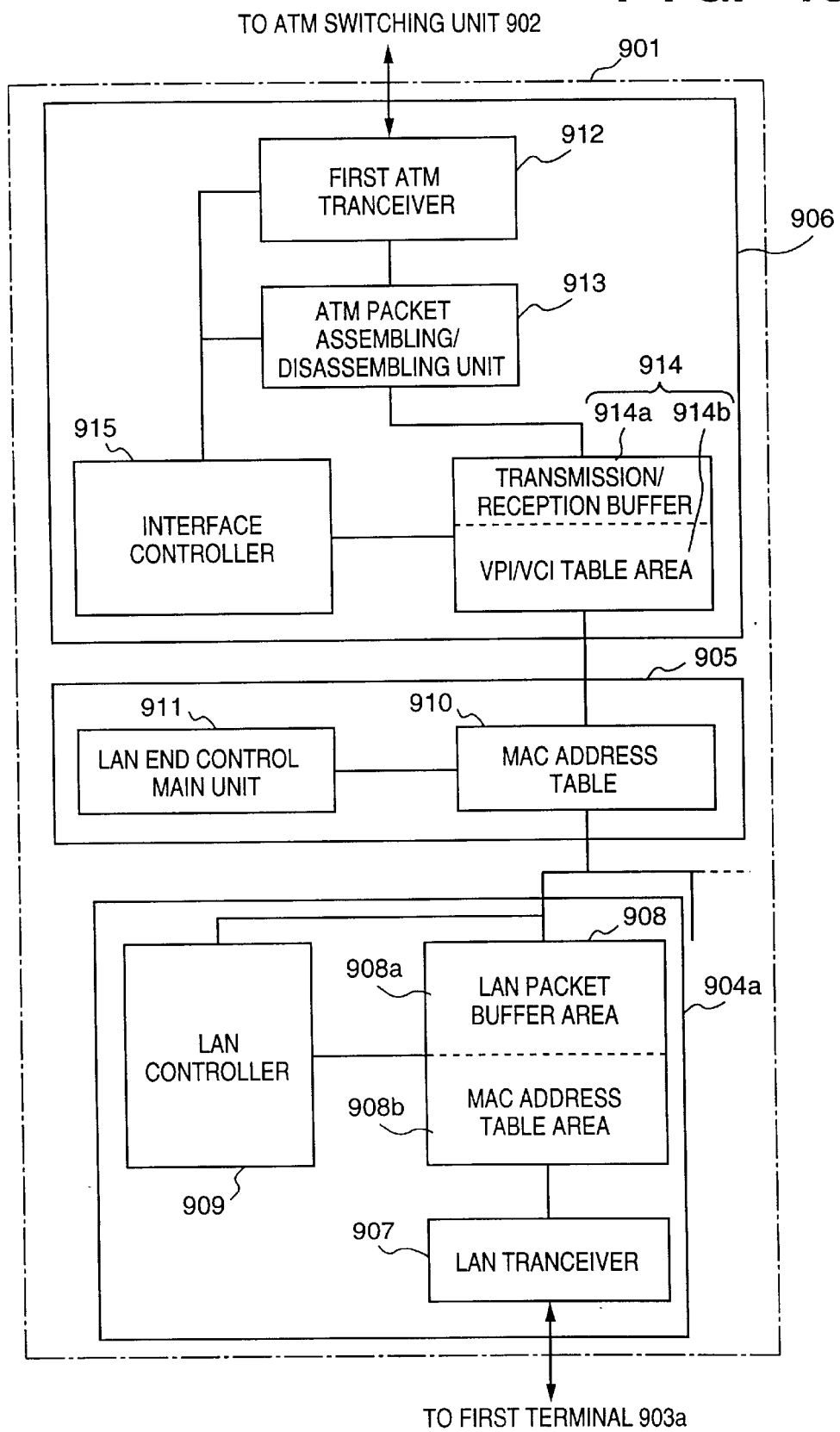

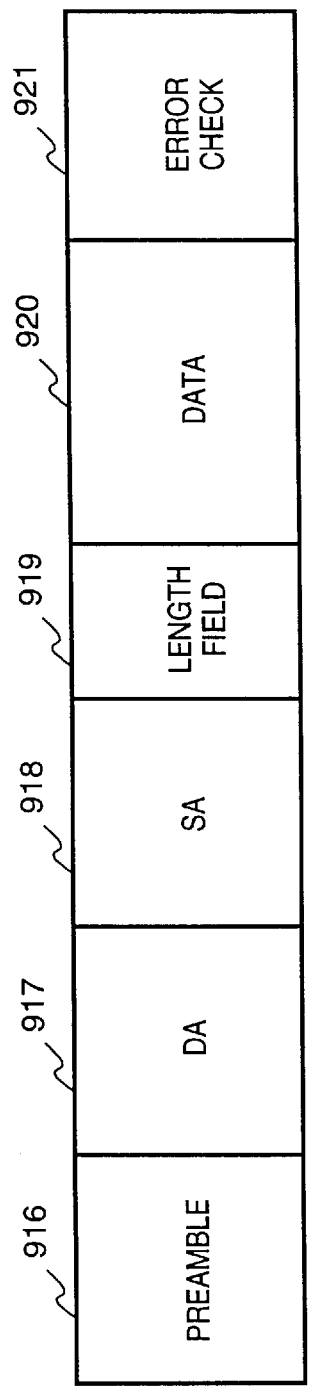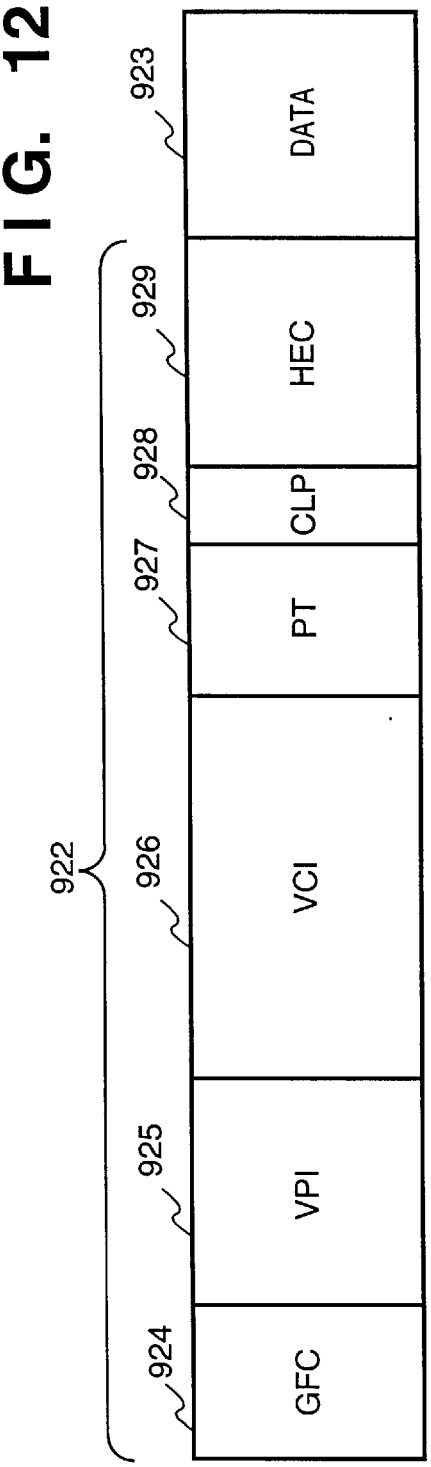

ASYNCHRONOUS TRANSFER MODE PACKET CONVERSION TO ONE OF PLURAL FORMATS

BACKGROUND OF THE INVENTION

The present invention relates to an asynchronous transfer mode (ATM) control apparatus and, more particularly, to an ATM control apparatus utilizing asynchronous transfer mode technique which is a high-speed information transfer/exchange technique used with a wide area ISDN.

There are some known conventional techniques to connect a plurality of local area networks (LANs), such as the Ethernet, by using bridges and routers so as to expand the number of communication terminals connected to the LANs and to reserve pass-bandwidths for communication. Further, a technique to use a hub having a switching function, namely a switching hub, to connect a plurality of communication terminals has been developed recently so as to expand the number of connected communication terminals and to reserve pass-bandwidth for communication between LANs. The aforesaid conventional techniques are embodied by a configuration which uses a concentrator having a switching function, and which is constituted to select a LAN port of a bridge, a router, a switching hub, or the like, from which data is outputted, in accordance with a media access control address (referred as "MAC address", hereinafter) in a LAN, such as the Ethernet.

Meanwhile, an asynchronous transfer mode (ATM) exchange system has been developed and standardization of the ATM has been discussed so as to simplify a protocol, aiming at a goal of high quality data transmission. In the ATM exchange system, information is divided into fixed-sized (53 bytes) blocks and each of the divided information is made into an ATM packet, then the ATM packets are sequentially sent out. Thereby, it is possible to reduce delay during information exchange, while keeping high transmission efficiency as in conventional packet exchange.

Further, an ATM-LAN, using the ATM transmission technology, has been developed as a LAN capable of dealing with multimedia. By using the ATM-LAN, image, sound, text, and the like, can be transmitted at high-speed while the functions of a conventional LAN is maintained.

As a first configuration for applying a switching hub on a conventional LAN to the ATM-LAN, a unit which serves as a bridge for connecting LANs, a LAN terminal, and a unit for assembling and dissembling an ATM packet, is provided at each LAN port of the switching hub, and the unit negotiates data transmission traffic handling with the switching hub (ATM switch).

However, according to the aforesaid first configuration, each unit provided in the LAN port need a function to assemble and disassemble ATM packets as well as a network administrating function by using an OAM (Operation, Administration and Maintenance) cell. Since each unit negotiates data transmission traffic with the ATM switch, there is a problem in that the amount of information which the ATM switch has to deal with increases.

Further, as a second configuration for applying a switching hub for a conventional LAN to the ATM-LAN, a switching hub for LAN is used to connect LANs, and when data is to be sent outside of the LANs which are connected to the switching hub, it is outputted to an ATM network through an ATM interface via an ATM switch.

However, in the second configuration, pass-bandwidth can not be used effectively when LANs, connected to the switching hub for LAN, are switched, which limits speed of transmitting information. Furthermore, two switching units, a switching unit for LAN and a switching unit for ATM, must exist. The two switching units in a single configuration may be regarded as being redundant when efficiency of configuration of the system is considered. In addition, there is a problem in that the amount of information which the ATM switch has to deal with increases, as in the aforesaid first configuration.

Further, since the ATM network technique is mainly developed as a large and global scale network technique of the next generation, most examples of the developed ATM network systems are naturally for relatively large scale networks, especially when an ATM exchange apparatus is developed. As for examples, the ATM-LAN is developed in limited topologies, such as a star, a ring, and so on.

However, the goal of the aforesaid ATM-LAN systems is to effectively configure LANs in an ATM network, and there is a problem in that the cost of manufacturing an interface increases in order to use conventional software for a network and to connect the ATM network to conventional hardware. In other words, there are many discussions about topologies of ATM-LAN in which the ATM network tends to be considered as prime importance in the discussion. Therefore, when a conventional LAN (e.g., Ethernet and token ring) is used in an ATM-LAN, since optimization of the configuration of the ATM network is mainly considered as a matter of importance, there is a possibility that the load on conventional software and hardware for a LAN system increases.

SUMMARY OF THE INVENTION

The present invention has been made in consideration of above situation, and has as its object to provide an ATM network control system which integrates with conventional software and hardware while keeping the feature of the ATM network communication, and has an architecture that can be easily and cheaply constructed in accordance with its use and scale of the network.

Further, it is another object of the present invention to provide an ATM network control apparatus whose switching function operates at high-speed by simplifying the configuration of the ATM network control apparatus and which can easily reserve pass-bandwidth for communication between LANs.

According to the present invention, the foregoing object is attained by providing an ATM network control apparatus comprising: ATM packet receiving means for receiving an ATM packet; storage means for storing a table of header information of at least one communication network; changing means for changing header of the ATM packet received by the ATM packet receiving means on the basis of information obtained by referring to the header of the ATM packet and the table stored in the storage means; output means for outputting the ATM packet whose header is changed by the changing means to a corresponding communication network; a general purpose bus line to which the ATM packet receiving means, the storage means, the changing means, and the output means are connected; and a high-speed bus line to which the ATM packet receiving means, the storage means, the changing means, and the output means are connected.

Further, the foregoing object is also attained by providing an ATM network control apparatus which is connected to an ATM switching apparatus comprising: a plurality of network end means for connecting to a plurality of networks, each of which includes first determination means for determining whether or not a destination of data sent from one of the plurality of communication networks, which is connected to one of the network end means, is for other communication network or for an ATM network and first output means for sending the data to outside of the network end means when it is determined that the destination of the data is for other communication network or for the ATM network; ATM packet assembling means for assembling an ATM packet from the data; and transmission means for transmitting the ATM packet to the ATM switching apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an explanatory view showing a configuration of an ATM network according to the third embodiment of the present invention;

FIG. 10 is a block diagram showing a detailed inside configuration of an ATM terminal adapter;

FIG. 11 shows a frame configuration of a LAN packet;

FIG. 12 shows a frame configuration of an ATM packet;

DETAILED DESCRIPTION OF THE PREFERRED EMBODIMENTS

Preferred embodiments of the present invention will be described in detail in accordance with the accompanying drawings.

<FIRST EMBODIMENT>

Figure 1:
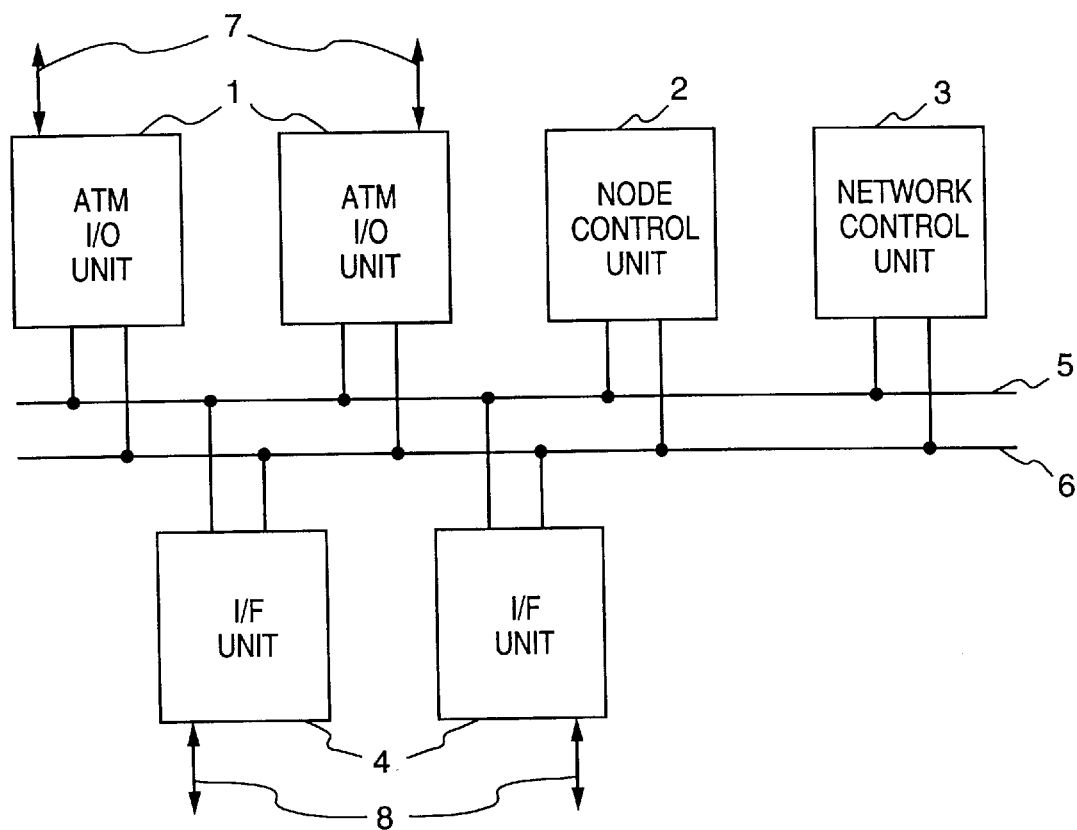
FIG. 1 is a block diagram illustrating a configuration of an ATM network control apparatus according to a first embodiment of the present invention.

FIG. 1 is a block diagram showing a configuration of an ATM network control apparatus according to a first embodiment of the present invention. In FIG. 1, reference numeral 1 denotes an ATM input/output (I/O) unit which receives ATM packets via ATM line 7, performs serial-parallel conversion on the received ATM packets and sends the converted ATM packets onto a bus line. Further, the ATM I/O unit 1 sends data received via the bus line to the ATM line 7 as ATM packets.

Reference numeral 2 denotes a node control unit which refers to header information included in an ATM packet received via the bus line and a table (referred as "reference table", hereinafter) stored in itself, then sends the ATM packet to a desired unit via the bus line in accordance with data obtained from the reference table.

Further, reference numeral 3 denotes a network control unit having a CPU, which performs analyzing process by using software. The network control unit 3 functions to update the reference table which is stored in the node control unit 2 and a function to decide contents for updating the reference table by analyzing the contents of packets which include information on the connection, disconnection, operation, and administration of the network, by using a software.

Reference numeral 4 denotes a general purpose interface unit which has a function to convert ATM packets received via the bus line into signals suitable for itself and a function to convert signals suitable for the general purpose interface unit into ATM packets.

Further, the network control apparatus has a general purpose bus line 5 and a high-speed input/output (I/O) bus line 6, and the ATM I/O unit 1, the node control unit 2, the network control unit 3, and the general purpose interface units 4 are connected to the general purpose bus line 5 and the high-speed I/O bus line 6. Accordingly, it is possible to easily and cheaply construct an appropriate apparatus to its use and scale of the network.

Furthermore, reference numeral 8 denotes an I/F line for connecting to each terminal.

Next, the operation of the network control apparatus shown in FIG. 1 will be explained. ATM packets are sent and received from the ATM I/O unit 1. The received ATM packets are processed by serial-parallel conversion, and the ATM I/O unit 1 requests interruption to the node control unit 2 via the general purpose bus line 5. When the node control unit 2 accepts the interruption request, the serial-parallel converted ATM packets are sent out to the high-speed I/O bus line 6 sequentially from the top of the header.

After the node control unit 2 receives the ATM packets via the high-speed I/O bus line 6, it updates the header of the ATM packets by referring to the header information included in the ATM packets and the reference table stored in itself. Thereafter, the node control unit 2 outputs via the high-speed I/O bus line 6.

It should be noted that the reference table stores information for updating header address so as to deal with the settings of virtual path by using virtual path and virtual channel which are specific for an ATM network. As for the reference table, it is explained below in detail with reference to FIGS. 7 and 8.

Figure 7:
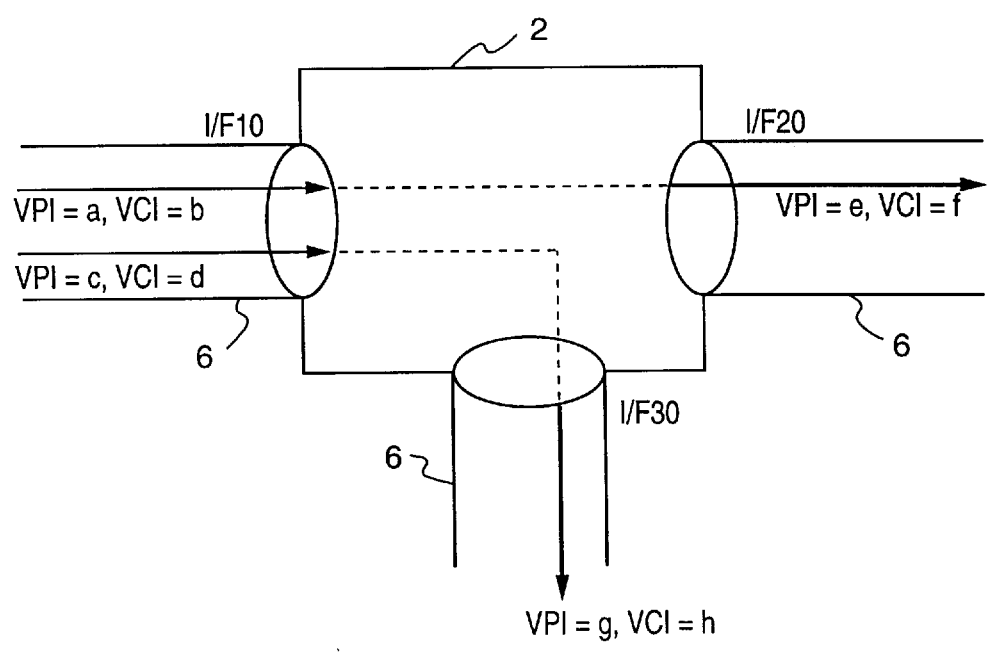
FIG. 7 is an explanatory view showing an operation of a node control unit.

FIG. 7 is an explanatory view showing an operation of a node control unit 2 for updating a virtual path identifier (VPI) and a virtual channel identifier (VCI) included in the top of the header of an packet which is inputted and outputted via the high-speed I/O bus line 6. In FIG. 7, I/F 10 is connected to the ATM I/O unit 1, and I/F 20 and I/F 30 are connected to units such as the general purpose interface units 4. In an example of FIG. 7, if a packet which is received from the ATM I/O unit 1 via the I/F 10 has header whose VPI and VCI values are a and b, respectively, then the VPI and VCI of the packet are updated to e and f, respectively, and sent to the general purpose interface unit 4 from the I/F 20. Similarly, if a packet has header whose VPI=c and VCI=d, then the VPI and VCI are updated to g and h, respectively, and sent to the general purpose interface unit 4 from the I/F 30.

Figure 8:
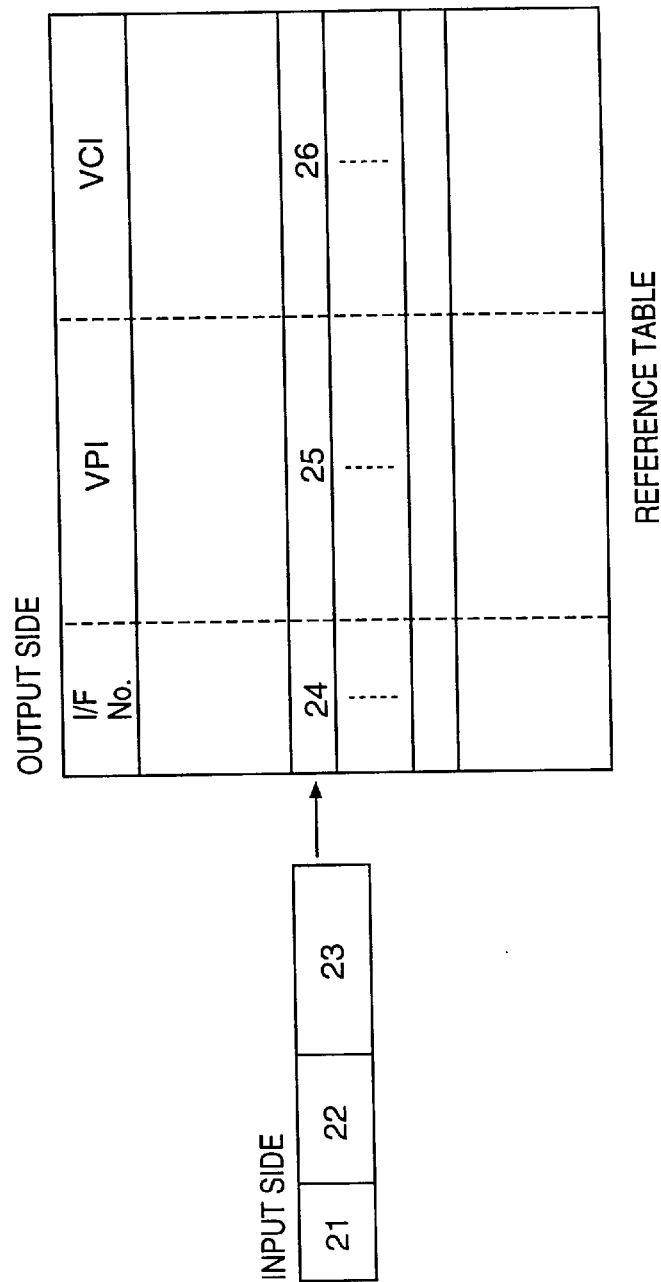
FIG. 8 is an example of an exchange table.

FIG. 8 is an example of the reference table, corresponding to the operation of FIG. 7, stored in the node controller unit 2

In FIG. 8, reference numeral 21 denotes an interface number assigned to the units; 22, the VPI value of a received packet; and 23, the VCI value of the same. By referring to the reference table which uses these values as address values, the VPI and VCI values of the received ATM packet are obtained, thereby it becomes possible to designate a destination unit.

The network control unit 3 can update the reference table stored in the node control unit 2 at initialization, control and interrupt each unit via the general purpose bus line 5, as well as directly send ATM packets to each unit via the high-speed I/O bus line 6.

By configuring the ATM network control apparatus as described above, after the communication path is established, switching of the destination and transmission of the packet are performed by means of hardware. Therefore, the transmission of the packet can be performed at very high-speed (e.g., 155.52 Mbps).

Figure 5:
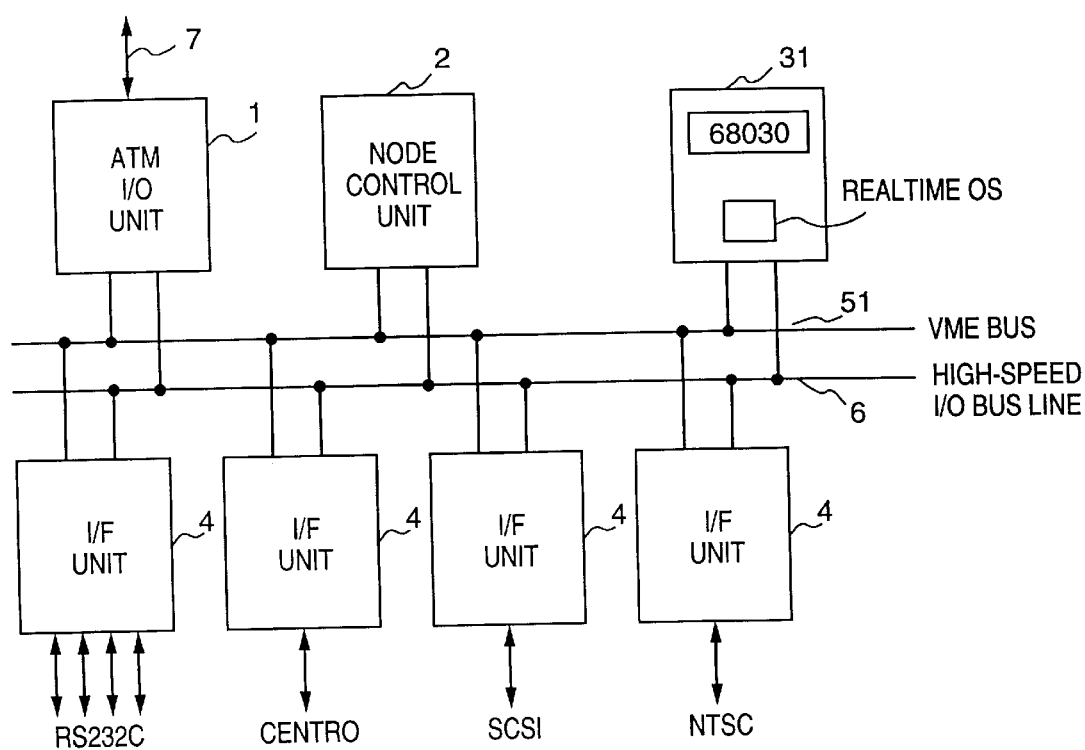
FIG. 5 is an example of the ATM network control apparatus according to the first embodiment of the resent invention.

Referring to FIG. 5, a specific example of an ATM network control apparatus as shown in FIG. 1 will be described. In FIG. 5, the same units and elements as those in FIG. 1 are referred by the same reference numerals and explanation of those are omitted.

As shown in FIG. 5, a VERSA module European (VME) bus 51 is used as a general purpose bus line. Each of the VME bus 51 and the high-speed I/O bus line 6 has 16-bit width, and operates in accordance with a 19.44 MHz clock. Therefore, the total speed of the I/O buses becomes 622 Mbps, thereby the switching speed of the ATM network control apparatus becomes the same value. A CPU 68030, available from the Motorola, Inc., is used as a CPU of a network controller 31, so that the network management and control program run on a real-time operation system, thus a virtual path can be established. Further, conventional interfaces, such as RS232C, CENTRO, SCSI, NTSC, are connected via the general interface units.

With the configuration as described above, when the apparatus is boosted up, a reference table corresponding to each interface unit to be connected (e.g., RS232C, CENTRO, SCSI, NTSC), which is used for routing is generated in the node controller unit 2 from the network control unit 31.

Further, each interface unit 4 has a function of assembling and disassembling ATM packets.

When the reference table is generated, an I/F number is set to each interface unit and stored, same to the initial values of VPI and VCI. An example in which an ATM packet is sent out from the RS232C unit to the ATM line via the ATM unit will be described below.

When the R3232C unit receives data, it assembles the received data into ATM packets, and outputs the ATM packets as parallel data to the high-speed I/O bus line 6. Thereafter, the VPI and VCI values in the header of the ATM packets in the parallel data are updated by referring to the reference table stored in the node control unit 2, then the ATM packets are outputted to the high-speed I/O bus line 6. The parallel data is inputted into the ATM I/O unit 1, and outputted to the ATM line 7.

<SECOND EMBODIMENT>

Figure 2:
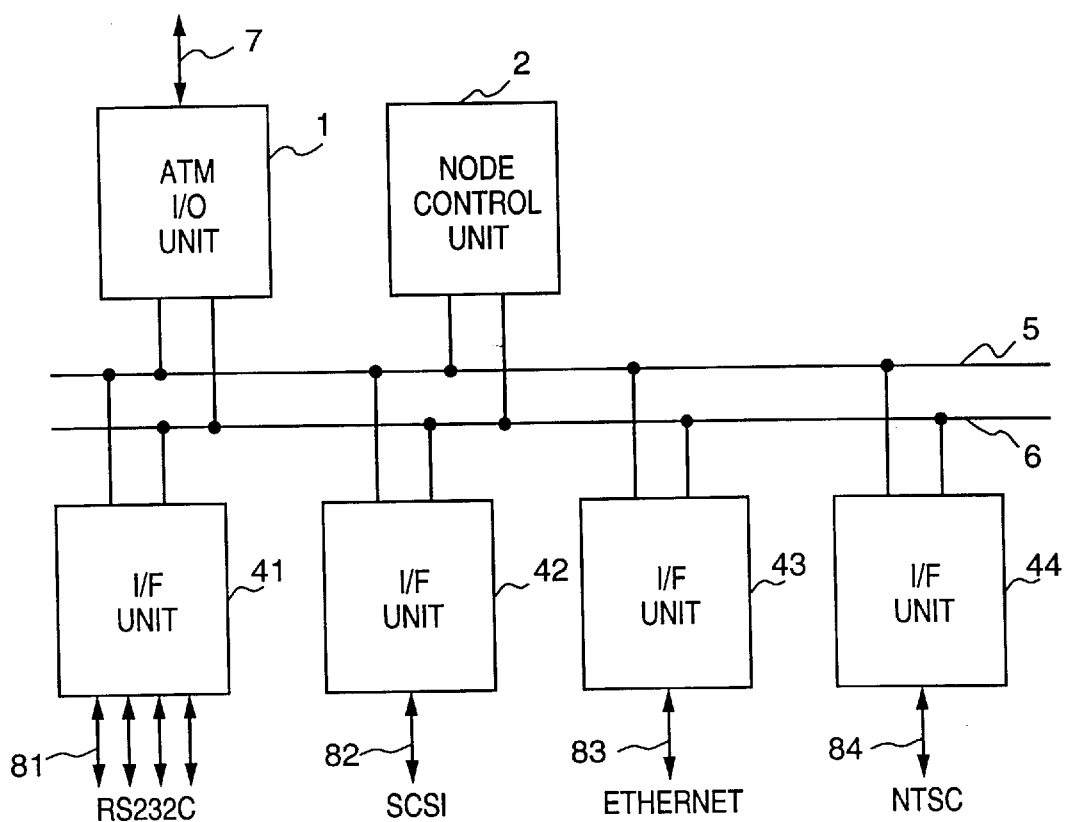
FIG. 2 is a block diagram illustrating a configuration of an ATM network control apparatus according to a second embodiment of the present invention.

A second embodiment of the present invention will be descried below with reference to FIG. 2. In FIG. 2, the same units and elements as those in FIG. 1 are referred by the same reference numerals and explanation of those are omitted.

In FIG. 2, only the node control unit 2 is connected as a controller of the ATM network control apparatus. In this configuration, the network control unit 3 is omitted, since values of the reference table are fixed. According to the configuration shown in FIG. 2, the ATM network control apparatus is used for specific communication, and various kinds of general purpose interfaces (e.g., RS232C81, SCSI82, Ethernet83, NTSC84) are connected to the apparatus.

According to the ATM network control apparatus shown in FIG. 2, an ATM packet which is received via the ATM line 7 can be outputted to one of the general purpose interface lines, RS232C81, SCSI82, Ethernet83, NTSC84, via the general purpose interface units 41 to 44. Further, it is able to convert data received from one of the general purpose interface lines, RS232C81, SCSI82, Ethernet83, NTSC84, via the general purpose interface units 41 to 44 into ATM packets and send the ATM packets to the ATM line 7 via the ATM I/O unit 1. As descried above, it is possible to construct the general and flexible ATM network control apparatus easily and less costly.

<THIRD EMBODIMENT>

Next, a third embodiment will be described with reference to FIG. 3.

Since the network control unit 3 in FIG. 1 includes a CPU and has a function to process by using software, the network control unit 3 can perform an advanced network administration, operation and virtual path setting. Further, the network controller supervises and controls the state of each unit via the general purpose bus line 5 and exchanges packets with a network controller of other ATM network control apparatus via the high-speed I/O bus line 6, thereby the virtual path is established. An ATM-LAN constructed by connecting a plurality of ATM network control apparatuses each of which has both the node control unit 2 and the network control unit 3 is shown in FIG. 3.

Figure 3:
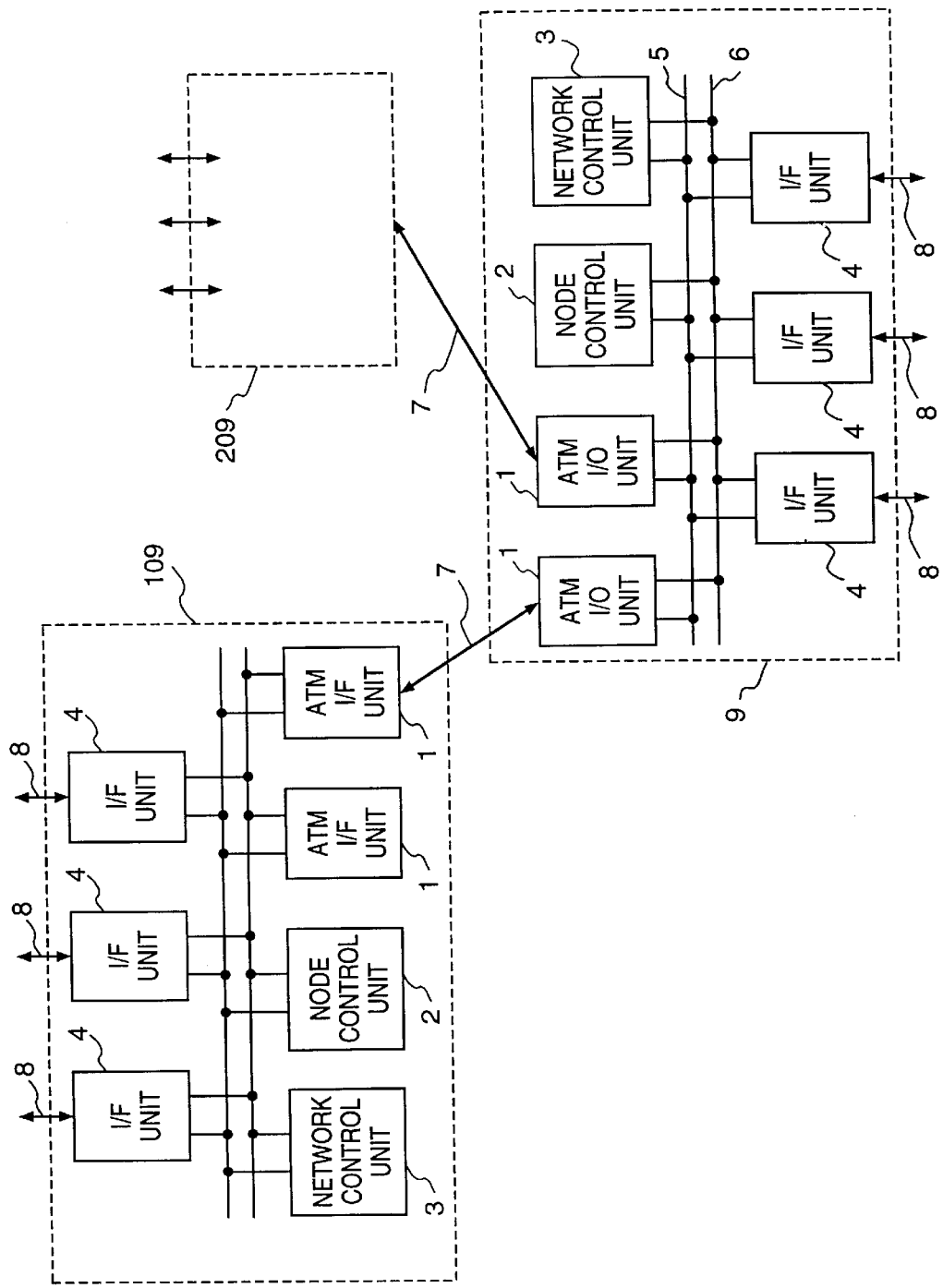
FIG. 3 is a block diagram illustrating an ATM-LAN constituted with a plurality of the ATM network control apparatuses according to a third embodiment of the present invention.

In FIG. 3, the same units and elements as those in FIG. 1 are referred by the same reference numerals and explanation of those are omitted.

In FIG. 3, reference numeral 9 denotes an ATM network control apparatus having the same configuration as that shown in FIG. 1, so do the ATM network control apparatuses 109 and 209.

By arranging a plurality of ATM network control apparatuses each of which comprises a general purpose bus line, a high-speed I/O bus line, a node control unit, a network control unit, an ATM I/O unit, and general purpose interface units, and updating an address in header of an ATM packet in accordance with a reference table, stored in each node control unit, which is managed on the basis of a network control software operated by each network control unit, it becomes possible to control and form the ATM network by using a virtual path and a virtual- channel. Thereby it becomes possible to easily construct an ATM network of N to N communication and connect various kinds of interfaces to each ATM network control apparatus by connecting them to the general purpose interface units.

FIG. 4 shows an ATM network constructed by arranging a plurality of ATM network control apparatuses each of which is shown in FIG. 1.

In FIG. 4, reference numerals 301, 302, 303, and 304 denote ATM switching apparatuses (AH); 401, 402, 403, and 404, terminal adapters (TA); and 501, 502, 503, and 504, terminals (TE).

Each of the ATM switching apparatuses (AH) 301 to 304 comprises the general purpose bus line 5, the high-speed I/O bus line 6, the node control unit 2, the network control unit 3, and the ATM I/O unit 1, and it mainly controls the network and performs a switching function. In this embodiment, for example, the ATM I/O unit 1 in the ATM switching apparatus 301 is connected to the ATM I/O units in the ATM switching apparatuses 302 and 304 and also to the terminal adapter 401.

Each of the terminal adapters 401 to 404 comprises the general purpose bus line 5, the high-speed I/O bus line 6, the ATM I/O unit 1, and the general purpose interface units 4.

Then, the ATM I/O unit inside of the terminal adapter and the ATM I/O unit inside of the ATM switching apparatus are connected, and each general purpose interface unit 4 inside of the terminal adapter and terminals are connected.

According to the configuration of the apparatus shown in FIG. 4, by constructing the ATM switching apparatus as in FIG. 1, consisting of the general purpose bus line, the high-speed I/O bus line, the node control unit, the network control unit, and the ATM I/O unit, whose main functions are network control and switching, and the terminal adapter, consisting of the general purpose bus line, the high-speed I/O bus line, the ATM I/O unit, and the general use interface units, it is possible to easily construct an ATM network of N to N communication by using a plurality of the ATM switching apparatuses. Further, since the terminal adapters which are connected to the ATM I/O units of the ATM switching apparatuses have a terminating function, a function to process ATM packets, and a function to converts the ATM packet into general purpose interface signals and vice versa, thereby various kinds of interfaces can be connected to the terminal adapters easily.

<FOURTH EMBODIMENT>

Figure 6:
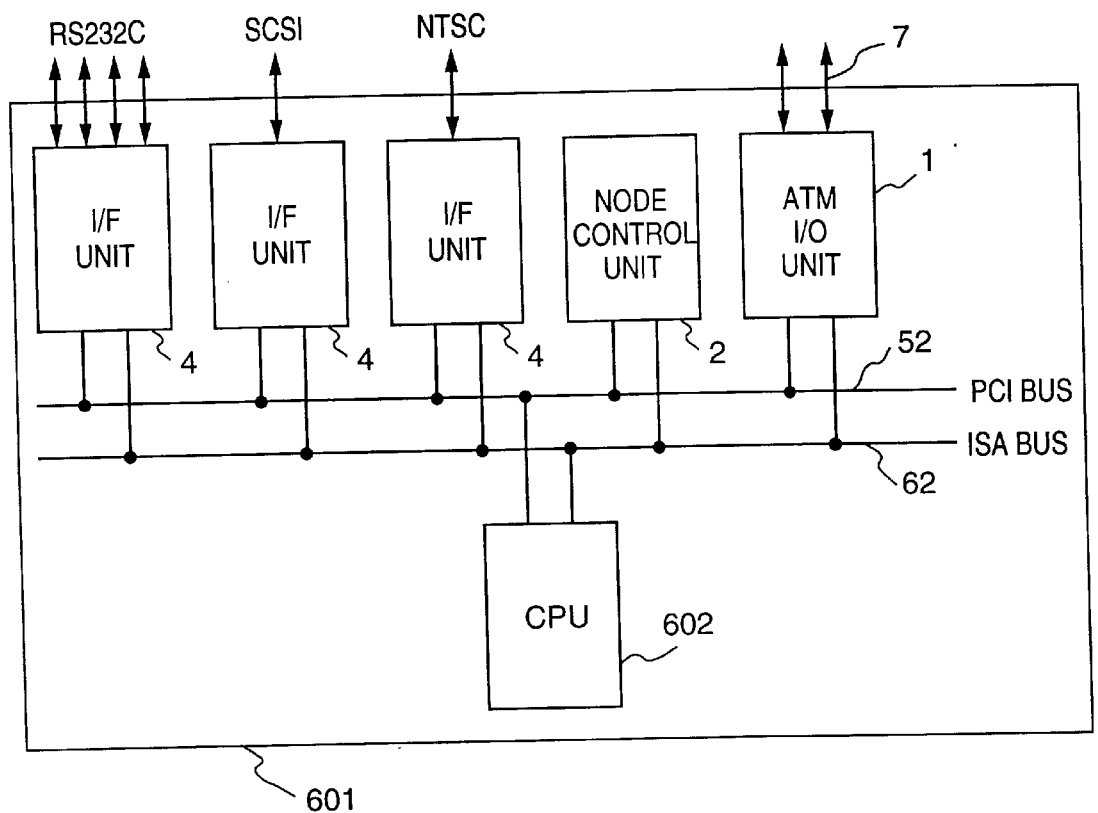
FIG. 6 is a personal computer which includes the ATM network control apparatus according to a fourth embodiment of the present invention.

Referring to FIG. 6, a fourth embodiment will be described below. In FIG. 6, the same units and elements as those in FIG. 1 are referred by the same reference numerals and explanation of those are omitted.

FIG. 6 is a personal computer which includes the ATM network control apparatus shown in FIG. 1. A bus provided inside of a personal computer is used as a general purpose bus line, and other bus is used as a high-speed I/O bus line. In the fourth embodiment, those buses are PCI bus and ISA (or EISA: extended industry standard architecture) bus.

In FIG. 6, reference numeral 601 denotes a personal computer PC/AT available from the IBM Corp. in the United States, for example; 602, a CPU of the personal computer; 52, a PCI bus which is provided inside of the personal computer as a general purpose bus line; and 62, an ISA bus which is also provided inside of the personal computer as a high-speed I/O bus line. With this configuration, an operation system, Windows (by Microsoft Corp., U.S.A.) can be used, for instance.

Further, the personal computer 601 shown in FIG. 6 may be replaced by a work station.

In both cases, the ATM I/O unit 1, the node control unit 2, and the general purpose interface units 4 are provided on an internal card of a general purpose computer or a general purpose work station. CPU 602 in the computer or the work station serves as a network controller. Thereby, it is easy to construct an ATM network and to connect various kinds of interfaces to the ATM network.

According to the fourth embodiment as described above, ATM network tools can be configured by using available general purpose hardware (e.g., VME bus, PCI bus, personal computer) and software (e.g., Windows), thus a simplified general purpose ATM multiplexing device (one to one communication), a front-end directional simplified ATM network (N to N communication on ATM-LAN), an ATM switching device, and the like, which can realize conventional software and hardware easily and cheaply.

<FIFTH EMBODIMENT>

Figure 9:
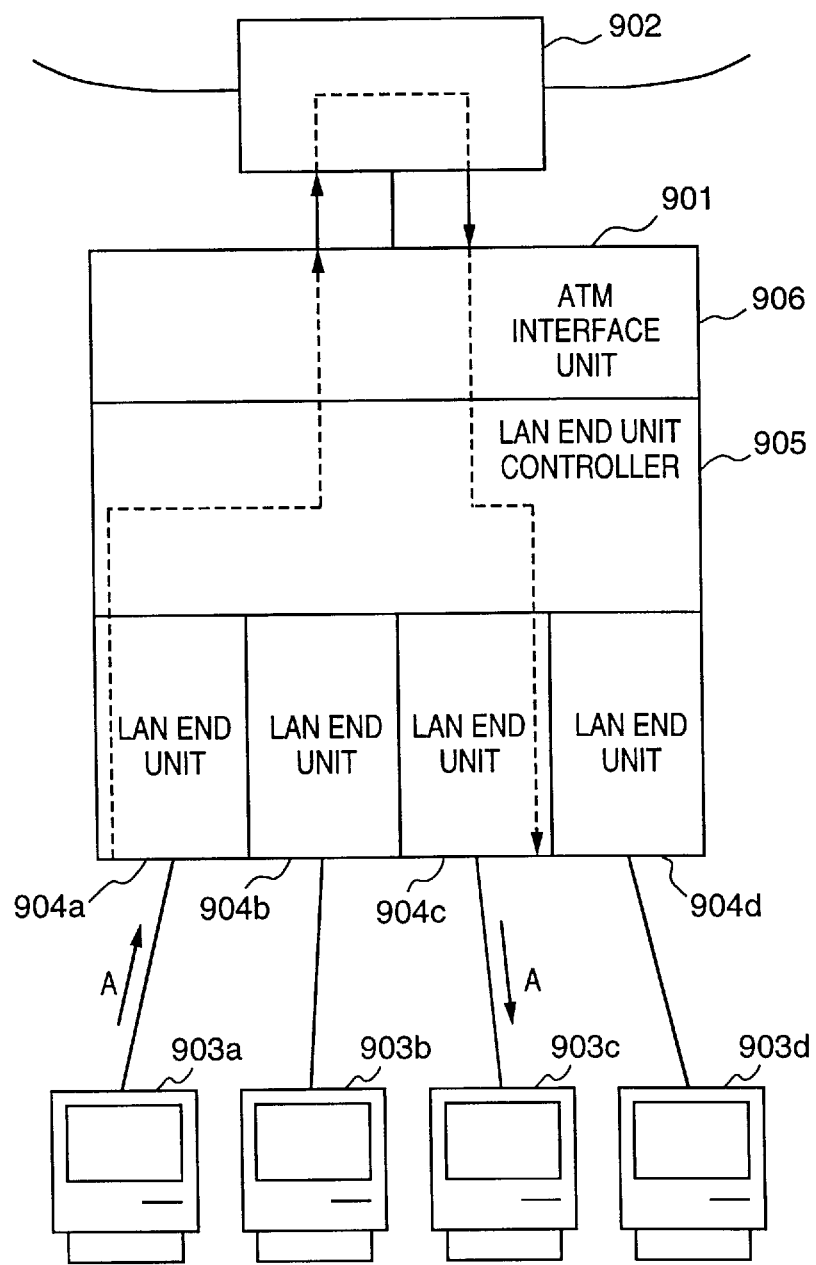
FIG. 9 is a block diagram showing an example of an ATM-LAN control apparatus according to a fifth embodiment of the present invention.

FIG. 9 is a block diagram showing an example of an ATM network control apparatus according to a fifth embodiment.

As shown in FIG. 9, the ATM network control apparatus comprises an ATM terminal adapter 901, an ATM switching apparatus 902. The ATM terminal adapter 901 connects to conventional LANs, such as the Ethernet, converts LAN packets into an ATM packets, which will be described later, when necessary, transmits information to a destination communication terminal, and converts received ATM packets into-LAN packets. The ATM switching apparatus 902 is connected to the ATM terminal adapter 901, and performs ATM switching operation.

Further, the ATM terminal adapter 901 includes a first to fourth LAN end units 904a to 904d which are respectively connected to a first to fourth communication terminals 903a to 903d, a LAN end unit controller 905 for controlling these first to fourth LAN end units 904a to 904d, and an ATM interface unit 906 for interfacing with the ATM switching apparatus 902. The first to fourth communication terminals 903a to 903d connect conventional LANs, such as the Ethernet.

FIG. 10 is a block diagram showing a detailed inside configuration of an ATM terminal adapter 901. Only the first LAN end unit 904a is shown in FIG. 10 for the simplicity sake, and the second to fourth LAN end units 904b to 904d have the same configuration as the first LAN end unit 904a.

Referring to FIG. 10, the first LAN end unit 904a comprises a LAN transceiver 907 for transmitting and receiving LAN packets and the like to/from the first communication terminal 903a, a first memory 908 for storing information from the first communication terminal 903a and MAC addresses which are physical addresses of communication terminals on a LAN, and a LAN controller 909 for performing a predetermined control operation on the basis of information sent from either the LAN transceiver 907 or the LAN end unit controller 905.

More specifically, the first memory 908 has a LAN packet buffer area 908a for storing LAN packets which are received via the LAN transceiver 907 when a destination MAC address does not exist on the LAN to which the LAN end unit is connected, and a MAC address table area 908b for storing MAC addresses of a plurality of communication terminals which can be connected to the LAN on the basis of information obtained in advance. Further, the LAN packet buffer area 908a can be used as an output buffer used for outputting LAN packets received from the LAN end unit controller 905 to the first communication terminal 903a.

Furthermore, the LAN controller 909 has a supervising unit for supervising information on a LAN and a determination unit for determining whether an address which is included in the information matches to the address of the destination communication terminal or not. Then, the LAN controller 909 checks a MAC address of the destination which may be obtained when the address in the information and the address of the destination communication terminal match, and, when a plurality of communication terminals are connected to the LAN, if no communication terminal on the LAN has the same MAC address, the LAN controller 909 passes the MAC address to the LAN end unit controller 905. Further, if the destination MAC address of a LAN packet which is received from the LAN end unit controller 905 matches one of the MAC addresses of the communication terminals which are on the LAN, the LAN controller 909 sends the LAN packet onto its own LAN.

The LAN end unit controller 905 has a MAC address table (second memory) 910 for storing MAC addresses generated for each of the first to fourth LAN end units 904a to 904d, and a LAN end control main unit 911 for performing a predetermined control operation on the basis of information from the first to fourth LAN end units 904a to 904d or the ATM interface 906. More specifically, the LAN end control main unit 911 sends all the LAN packets received from the first to fourth LAN end units 904a to 904d to the ATM interface unit 906, as well as detects a MAC address from a LAN packet received from the ATM interface 906, compares the detected MAC address to MAC addresses stored in the MAC address table 910, checks whether or not the corresponding MAC address exists on one of the connected LANs, and determines whether or not the received LAN packet is to be transmitted to one of the LAN end units 904a to 904d which are connected to the LAN end unit controller 905. Then, if there is corresponding MAC address, the LAN packet is passed to a LAN end unit to which a communication terminal having the destination MAC address is connected, whereas, if there is not any corresponding MAC address in the connected LANs, the LAN packet is abandoned.

The ATM interface unit 906 comprises a first ATM transceiver 912, an ATM packet assembling/dissembling unit 913, a third memory 914, and an interface controller 915. The first ATM transceiver 912 performs a protocol (signaling) for transmitting and receiving ATM packets and connecting the ATM interface 906 and the ATM switching apparatus 902, and detects a synchronous signal and errors. The ATM packet assembling/dissembling unit 913 converts ATM packets which are received from the first ATM transceiver 912 into LAN packets by dissembling the ATM packets and, conversely, converts LAN packets received from the LAN end unit controller 905 into ATM packets. Further, the third memory 14 has a transmission/reception buffer area 914a for temporarily storing received data or data to be transmitted and a VPI/VCI table area 914b for temporarily storing virtual path identifiers (VPI) and virtual channel identifiers (VCI) included in received ATM packets or ATM packets to be transmitted in a form of a table. The interface controller 915 controls the first ATM transceiver 912, the ATM assembling/dissembling unit 913, and the third memory 914. Further, the first ATM transceiver 912 also controls transmission and reception of OAM (Operation, administration and Maintenance) cells which are for controlling a network, on the basis of the control by the interface controller 915.

FIG. 11 shows a frame configuration of a LAN packet used in the fifth embodiment, and the frame configuration is based on IEEE (Institution of Electrical and Electronics Engineers) 802.3 specification.

A preamble field 916 includes a start frame delimiter, and consists of 8 bytes. Further, a destination address (DA) field 917 includes a destination MAC address and consists of 6 bytes. A source address (SA) field 918 includes a MAC address of the originating terminal, and consists of 6 bytes as the DA field 917. A length field 919 indicates the length of information, and consists of 2 bytes. Further, data field 920 contains data to be outputted onto a LAN, and occupies 46 to 1500 bytes depending upon the amount of the information. Furthermore, the error check field 921 consists of a cyclic redundancy check (CRC) field in a cyclic coding method in which errors are detected by a block, and uses 4 bytes. The LAN controller 909 detects the destination address stored in the DA field 917 in the LAN packet frame, and determines whether or not the detected destination address matches one of MAC addresses stored in the MAC address table area 908b, by comparing them.

FIG. 12 shows a frame configuration of an ATM packet as a data frame exchanged between the ATM terminal adapter 901 and the ATM switching apparatus 902.

A single ATM packet consists of a total of 53 bytes, and more specifically, it consists of header 922 and data field 923 which contains information to be transmitted.

The header 922 is constructed with a GFC (Generic Flow Control) field 924, a VPI field 925, a VCI field and a PT (Payload Type) field 927, a CLP (Cell Loss Priority) field 928, and a HEC (Header Error Control) field 929.

The GFC field 924 is used for generic flow control in order to prevent a plurality of ATM packets sent from a plurality of communication terminals from colliding with each other, and consists of 4 bits. The VPI and VCI are identifiers used for identifying the destination of an ATM packet, and the VPI field 925 uses 1 byte, and the VCI 926 uses 2 bytes. Each ATM packet is transmitted to the destination communication terminal by using these identifiers. The PT field 927 is for indicating whether information in the data field 923 is information of the communication terminal connected to a LAN or control information for a public network, and consists of 3 bits. The CLP field 928 is for the packet priority indication showing whether an ATM packet has high or low priority, and consists of 1 bit. The HEC field 929 is for detecting an error which may be contained in 4 bytes of fields between the GFC field 924 and CLP field 928 in the header 922, and consists of 1 byte. ATM packets having aforesaid frame configuration are assembled/disassembled by the ATM packet assembling/disassembling unit 913 by using information stored in the transmission/reception buffer area 914a under control of the interface controller 915.

Figure 13:
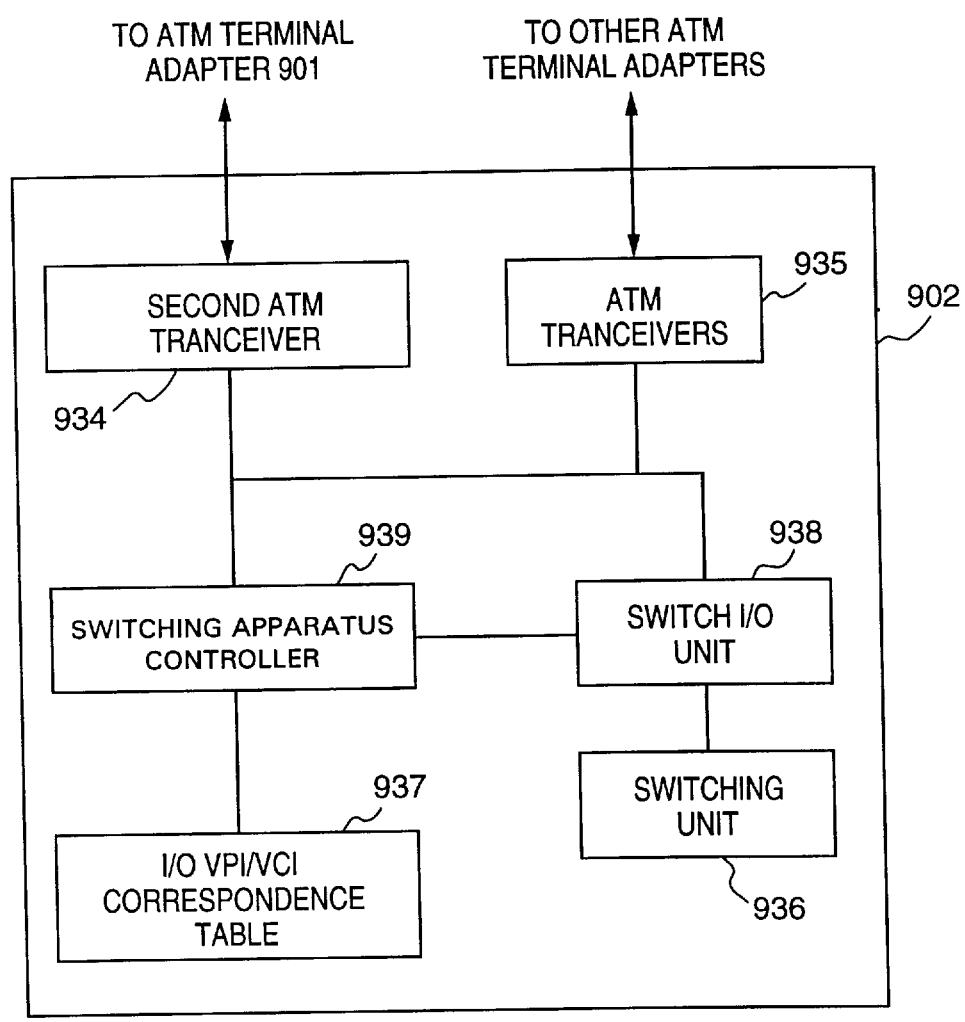
FIG. 13 is a block diagram showing a detailed configuration of an ATM switching apparatus.

FIG. 13 is a block diagram showing a configuration of the ATM switching apparatus 902. The ATM switching apparatus 902 comprises a second ATM transceiver 934 which is connected to the ATM terminal adapter 901, other ATM transceivers 935 each of which is connected to other ATM terminal, a switching unit 936 having a switching function using a tag, an input/output VPI/VCI correspondence table for converting VPI/VCI of input data to VPI/VCI suitable for outputting side and storing them, a switch input/output unit 938 for adding or deleting a tag to/from an ATM packet received from the second ATM transceiver 934 and the ATM transceivers 935, and a switching apparatus controller 939 for controlling the second ATM transceiver, other ATM transceivers 935, the switching unit 936, the I/O VPI/VCI correspondence table 937, and the switch I/O unit 938.

Further, the second ATM transceiver 934 and ATM transceivers 935 transmit and receive ATM packets, and detect a synchronization signal and errors, as the first ATM transceiver 912.

More specifically, the VPI/VCI of an ATM packet received by the second ATM transceiver 934 or one of the ATM transceivers 935 is changed to VPI/VCI for the destination terminal by referring to the I/O VPI/VCI table 937. Thereafter, a necessary tag is added to the ATM packet or a tag is deleted from the ATM packet on the basis of the output from the switching unit 936. Then, the switch I/O unit 938 temporarily stores the ATM packet, with new VPI/VCI, which is to be outputted onto a network.

Next, a case where information is transmitted from the first communication terminal 903a to the third communication terminal 903c, as shown by an arrow A in FIG. 9 in the ATM network control apparatus, having the configuration as described above, will be described.

When a communication path has not been established between the first communication terminal 903a and the third communication terminal 903c, it is necessary to establish a communication path by using address resolution protocol command in the Ethernet, for example. Accordingly, an ARP command is outputted from the first communication terminal 903a to the third communication terminal 903c. The ARP command includes an Internet Protocol (IP) address (terminal identification information) of the third communication terminal 903c as the destination terminal, and when the IP address of the ARP command matches to the IP address owned by the third communication terminal, it becomes possible for the first communication terminal 903a to obtain a MAC address of the third communication terminal 903c. First, when it is determined that the ARP command is received by the first LAN end unit 904a of the ATM terminal adapter 1 which is connected to the first communication terminal 903a, the ARP command is broadcasted without specifying the destination. Accordingly, the ARP command is received not only by the second to fourth communication terminals 903b to 903d but also by all the other ATM terminals on the network. Therefore, the ARP command is inputted into the ATM interface 906 from the first LAN end unit 904 via the LAN end unit controller 905, then, after changed into ATM packets by the ATM interface unit 906, they are inputted into the ATM switching apparatus 902. Next, The ATM packets which are inputted into the ATM switching apparatus 902 is transmitted to other ATM terminals as well as to the ATM interface 906 of the ATM terminal adapter 901 at the same time, then received by the second to fourth communication terminals 903b to 903d. In this case, the third communication terminal 903c which has an identical IP address to that of the ARP command outputs a response, constituted by adding the MAC address of the third communication terminal 903c to the ARP command, toward the first communication terminal 903a. Thereafter, the response is transmitted from the ATM interface unit 906 to the ATM switching apparatus 902. At this time, VPI/VCI values are set between the MAC address of the first communication terminal 903a and the MAC address of the third communication terminal 903c, and stored in the I/O VPI/VCI correspondence table 937 in the ATM switching apparatus 902.

Figure 14:
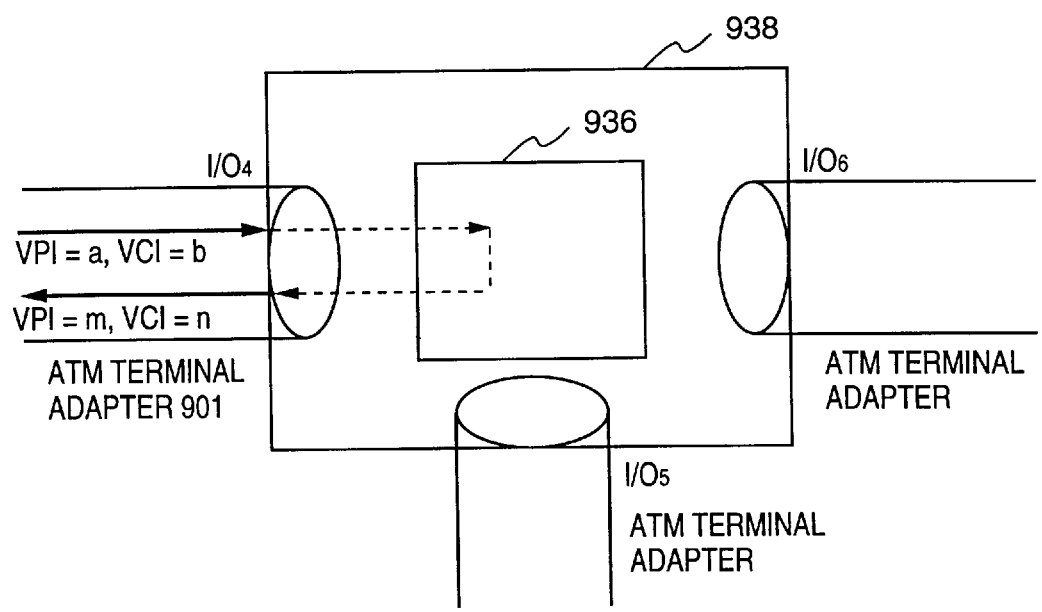
FIG. 14 is an explanatory view showing a packet transmission operation in a switch input/output unit and a switching unit in the ATM switching apparatus.

FIG. 14 is an explanatory view showing a transmission operation in the switch I/O unit 938 and the switching unit 936 of the ATM switching apparatus 902. Reference numeral I/$O_4$ denotes an I/O port for the ATM terminal adapter 901, and reference numerals I/$O_5$ and I/$O_6$ denote I/O ports for other ATM terminal adapters.

As for the first communication terminal 903a, VPI and VPI values used between the ATM interface 906 and the ATM switching apparatus 902 are set to "a" and "b", respectively, are inputted to the I/O port I/$O_4$, further, the VPI/VCI values are outputted form the I/O port I/$O_4$ to the first communication terminal 903a. Similarly, as for the third communication terminal 903c, VPI and VCI values used between the ATM interface 906 and the ATM switching apparatus 902 are set to "m" and "n", respectively, and inputted to the I/O port I/$O_4$, and the VPI/VCI values are outputted from the I/O port I/$O_4$ to the third communication terminal 903c. Then, these values are compared when the communication path between the first and third communication terminals is established for the first time, and stored in the I/O VPI/VCI correspondence table 937.

After the communication path is established as described above, if it is detected that DA field 917 of a LAN packet, sent from the first communication terminal 903a, includes a MAC address of the third communication terminal 903c, the LAN packet is sent to the ATM interface 906 via the LAN end unit controller 905. The ATM interface 906 converts the LAN packet into an ATM packet and sets the VPI of the ATM packet to "a" and the VCI to "b" so as to correspond to the destination MAC address of the LAN packet, then transmits the ATM packet and to the ATM switching apparatus 902. The ATM switching apparatus 902 changes the VPI and VCI, namely "a" and "b", of the ATM packet inputted from the I/O port I/$O_4$ to "m" and "n", respectively, then outputs the ATM packet to the ATM terminal adapter 901 via the first input/output port I/$O_4$. After the above switching, the ATM packet is changed to a LAN packet by the ATM interface 906 of the ATM terminal adapter 901, and sent to the LAN end unit controller 905. Then, the LAN end control main unit 911 of the LAN end unit controller 905 determines whether or not the MAC address of the third communication terminal 903c matches to the value of the DA field 917 of the LAN packet by referring to the MAC address table 910. If it is confirmed that the values match, then the LAN packet is transmitted to the third communication terminal 903c. As described above, by combining the ATM terminal adapter 901 and the ATM switching apparatus 902 of the fifth embodiment, an ATM-LAN switching can be realized.

In the ATM-LAN control apparatus as described above, since the ATM terminal adapter 901 has LAN end units 904a to 904d to which the first to fourth communication terminals 903a to 903d are connected, the LAN end unit controller 905 for controlling the LAN end unit 904a to 904d, and the ATM interface unit 906 for assembling/dissembling ATM packets, processes can be performed, and the ATM adapter 901 can alone perform every operation but switching, thereby improving efficiency of information processing.

Further, by combining the ATM network control apparatus of the fifth embodiment with an ATM switching apparatus having a high-speed switching function, it is possible to enjoy high-speed data exchange which is a feature of an ATM network, thereby realizing high-speed data exchange as a result of the improved processing efficiency. Furthermore, it is possible to easily reserve pass-bandwidth for data transmission.

The present invention can be applied to a system constituted by a plurality of devices, or to an apparatus comprising a single device. Furthermore, the invention is also applicable where the object of the invention is attained by supplying a program to a system or apparatus.

The present invention is not limited to the above embodiments and various changes and modifications can be made within the spirit and scope of the present invention. Therefore to appraise the public of the scope of the present invention, the following claims are made.

What is claimed is:

1. An ATM network control apparatus comprising:
   first connection means for connecting to a first communication apparatus by using an interface according to a first method;
   second connection means for connecting to a second communication apparatus by using an interface according to a second method which is different from the first method;
   first conversion means for converting data received via said first connection means into an ATM packet;
   second conversion means for converting data received via said second connection means into an ATM packet;
   storage means for storing a table of header information for at least one communication network;
   changing means for changing header information of the ATM packet converted by said first conversion means or said second conversion means on the basis of information obtained by referring to the header information of the ATM packet and the table stored in said storage means; and
   output means for outputting the ATM packet having header information changed by said changing means to a corresponding communication network.

2. The ATM network control apparatus according to claim 1, wherein said communication network is a local area network.

3. The ATM network control apparatus according to claim 1, further comprising a general purpose interface having ATM packet assembling and disassembling means.

4. The ATM network control apparatus according to claim 1 further comprising updating means for updating the table stored in said storage means.

5. The ATM network control apparatus according to claim 4, wherein said table includes information on virtual path identifiers and virtual channel identifiers.

6. The ATM network control apparatus according to claim 4, wherein said updating means generates data for routing on the communication network in the table.

7. The ATM network control apparatus according to claim 1, wherein the ATM network control apparatus is constructed inside of a computer.

8. An ATM network control method comprising:
   a connecting step of connecting to one of a first and a second communication apparatus by using a corresponding one of a first and second interface according to a corresponding one of a first method and a second method which is different from the first method;
   a converting step of converting data received via either the first or second interface into an ATM packet;
   a changing step of changing header information of the ATM packet converted in the converting step on the basis of information obtained by referring to the header information of the ATM packet and a header information table for at least one communication network; and
   an outputting step of outputting the ATM packet having header information changed at said changing step to a corresponding communication network.

9. The ATM network control method according to claim 8, wherein the communication network is a local area network.

10. The ATM network control method according to claim 8, wherein the table can be updated.

11. The ATM network control method according to claim 10, wherein the table includes information on virtual path identifiers and virtual channel identifiers.

12. The ATM network control method according to claim 10, wherein the table includes data for routing on the communication network.

13. An ATM network control apparatus connectable to an ATM switching apparatus, comprising:
   first network end means for communicating with a first communication network having a first communication method;
   second network end means for communicating with a second communication network having a second communication method different than the first communication method; and
   transmission means, shared by said first and second network end means, for assembling transmitted data from the first and second communication networks received by said first and second network end means according to the first and second communication methods, respectively, into an ATM packet and transmitting the ATM packet to the ATM switching apparatus,
   wherein each of said first and second network end means includes:
      first determination means for determining whether or not a destination of data sent from one of the first and second communication networks, which is connected to the network end means, is for the other of the first and second communication networks or for an ATM network; and
      first output means for sending the data to said transmission means when said first determination means determines that the destination of the data is the other communication network or the ATM network.

14. The ATM network control apparatus according to claim 13, further comprising:
   receiving means for receiving an ATM packet from the ATM switching apparatus;
   second determination means for determining a destination communication network of the ATM packet received by said receiving means;
   changing means for changing the ATM packet received by said receiving means to data having a data format which is suitable for the destination communication network determined by said second determination means; and
   second output means for outputting the data having the data format changed by said changing means to the destination communication network determined by said second determination means.

15. The ATM network control apparatus according to claim 14, further comprising first storage means for storing a table of header information, wherein said second determination means determines by referring to header of input data and the table stored in said first storage means.

16. The ATM network control apparatus according to claim 15, wherein each of said first and second network end means further includes second storage means for storing a table of header information, and said first determination means determines the destination of data by referring to the header of the data and the table stored in said second storage means.

17. The ATM network control apparatus according to claim 16, wherein each of said first and second network end means further comprises:

a network transceiver for transmitting and receiving data to/from at least one communication terminal which is connected to the network transceiver via a general purpose interface;

network control means for performing a predetermined control operation on the basis of information sent from the first and second networks or of the table stored in said first storage means; and supervising means for supervising information on the first or second network.

18. The ATM network control apparatus according to claim 13, wherein said first and second communication networks are local area networks.

19. A control method for controlling an ATM network control apparatus connectable to an ATM switching apparatus and first and second communication networks via first network end means for communicating with the first communication network having a first communication method and second network end means for communicating with the second communication network having a second communication method different than the first communication method, said method comprising:

a first determining step, performed by the first and second network end means, of determining whether or not a destination of data sent from one of the first and second communication networks is for the other of the first and second communication networks or for an ATM network;

a first output step, performed by the first and second network end means, of sending the data to outside of the network which sent the data when it is determined that the destination of the data is for the other communication network or for the ATM network; and a transmission step of assembling the data transmitted from the first and second communication networks received by the first and second network end means according to the first and second communication methods, respectively, into an ATM packet and transmitting the ATM packet to the ATM switching apparatus.

20. The control method according to claim 19, further comprising:

a receiving step of receiving an ATM packet from outside of the ATM switching apparatus;

a second determining step of determining a destination communication network of the ATM packet received at said receiving step;

a changing step of changing the ATM packet received at said receiving step to data having a format which is suitable for the destination communication network determined in said second determination step; and a second output step of outputting the data having the data format changed by said changing means to the destination communication network determined in said second determination step.

21. The control method according to claim 20, wherein, at said second determination step, determination is performed by referring to a header of the data packet and a predetermined table.

22. The control method according to claim 19, wherein said first and second communication networks are local area networks.

23. The control method according to claim 20, wherein, at said second determination step, determination is performed by referring to a header of the data packet and a predetermined table.

* * * * *

UNITED STATES PATENT AND TRADEMARK OFFICE
CERTIFICATE OF CORRECTION

PATENT NO. : 5,859,848

DATED : January 12, 1999

INVENTOR(S) : Genmei Miura, et al.

It is certified that error appears in the above-identified patent and that said Letters Patent is hereby corrected as shown below:

Column 3, line 37, delete "resent" and insert therefor -- present --.

Column 6, line 9, delete "descried" and insert therefor -- described --.

Column 6, line 67, delete "virtual-" and insert therefor -- virtual --.

Column 7, line 41, delete "converts" and insert therefor -- convert --.

Column 12, line 5, delete "form" and insert therefor -- from --.

Signed and Sealed this

Seventh Day of September, 1999

Attest:

Q. TODD DICKINSON

*Attesting Officer*       *Acting Commissioner of Patents and Trademarks*